United States Patent
Appleford et al.

(10) Patent No.: US 6,873,063 B1
(45) Date of Patent: Mar. 29, 2005

(54) ELECTRICAL POWER DISTRIBUTION SUITABLE FOR A SUBSTANTIALLY UNDERWATER SYSTEM

(75) Inventors: David Eric Appleford, Epping (GB); Brian William Lane, Canvey Island (GB); Jan Peter Lindholm, Lund (SE)

(73) Assignee: Alpha Thames Ltd., Essex (GB)

(*) Notice: Subject to any disclaimer, the term of this patent is extended or adjusted under 35 U.S.C. 154(b) by 414 days.

(21) Appl. No.: 10/070,231

(22) PCT Filed: Aug. 18, 2000

(86) PCT No.: PCT/GB00/03220
  § 371 (c)(1),
  (2), (4) Date: Feb. 28, 2002

(87) PCT Pub. No.: WO01/20746
  PCT Pub. Date: Mar. 22, 2001

(51) Int. Cl.$^7$ .................................................. H02J 1/20
(52) U.S. Cl. ........................... 307/149; 307/29; 307/36; 307/38
(58) Field of Search ........................... 307/29, 149, 36, 307/38

(56) References Cited

U.S. PATENT DOCUMENTS

| | | |
|---|---|---|
| 3,865,142 A | 2/1975 | Begun et al. |
| 4,772,806 A * | 9/1988 | Lean et al. ............. 307/38 |
| 5,299,312 A * | 3/1994 | Rocco, Jr. ............. 714/4 |
| 6,005,996 A * | 12/1999 | Webb .................... 385/24 |

FOREIGN PATENT DOCUMENTS

| | | |
|---|---|---|
| EP | 0 752 668 A1 | 1/1997 |
| GB | 2 202 561 A | 9/1988 |
| GB | 2 261 271 A | 5/1993 |
| WO | WO 97/14206 | 4/1997 |

OTHER PUBLICATIONS

P.L. Hunter and T. W. Johnson; Fault Tolerant, Hot–Pluggable Power System Design; Proceedings of the Annual Applied Power Electronics Conference and Exposition; Feb 13, 1994; 815–822; U.S. New York, IEEE, vol. CONF. 9.

* cited by examiner

*Primary Examiner*—Robert L. DeBeradinis
(74) *Attorney, Agent, or Firm*—Summa & Allan P.A.

(57) ABSTRACT

A substantially underwater system comprises a plurality of retrievable substantially autonomous subsea modules (12, 13, 17, 18) and switchgear (15, 16, 21a . . . h). A host facility (6) and the modules are connected in series so as to form a circuit, the host facility providing power to all of the modules. Operation of the switchgear electrically isolates a module or a plurality of serially adjacent modules so that the module or modules can be removed without cutting off the power supply to any of the remaining modules of the system. Module based parts of the switchgear (21a . . . h) only or a combination of module based parts (21a . . . h) and host facility based parts (15, 16) of the switchgear are actuated depending on which module or modules are isolated and removed.

37 Claims, 9 Drawing Sheets

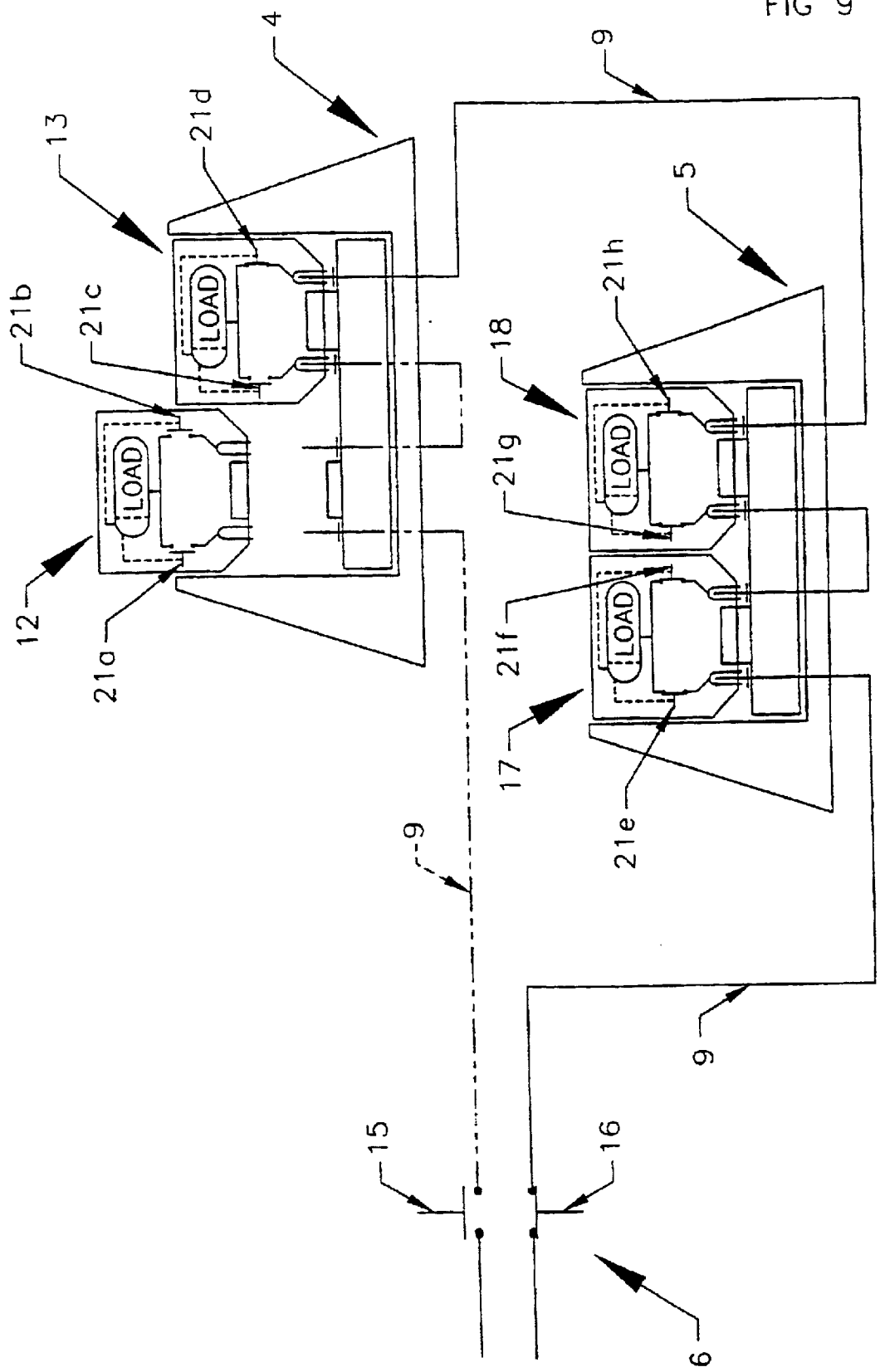

ELECTRICAL POWER DISTRIBUTION SUITABLE FOR A SUBSTANTIALLY UNDERWATER SYSTEM

BACKGROUND OF THE INVENTION

The present invention relates to electrical power distribution suitable for a substantially underwater system used in an underwater oil/gas field.

Conventional oil/gas fields have a plurality of wells linked to a host facility which receives the oil/gas via flow lines. If the underwater oil/gas field includes underwater processing units between the wells and the host facility, it would be useful to be able to reconfigure or replace an underwater processing unit without having to power down the other underwater processing units in the field and thereby significantly reduce production from the field.

Presently, any underwater processing units which require power/controlling rely on at least one expensive and complex multiple conduit hydraulic line to connect each part to a host facility on/above the sea surface or onshore.

SUMMARY OF THE INVENTION

It is an object of the present invention to provide an improved method and system which alleviates/solves problems associated with power distribution to a system, particularly one which is substantially underwater.

According to one aspect of the present invention there is provided a method of electrical power distribution or control signal distribution suitable for a substantially underwater system, comprising the steps of:
  providing a plurality of retrievable substantially autonomous modules, module isolating means and a host facility, the host facility and the modules being connected in series so as to form a circuit, the host facility providing power or control signals to all of the modules;
  isolating at least one module by operation of the module isolating means; and
  removing the isolated at least one module without cutting off the supply of power or control signals to any of the remaining modules of the system.

There is preferably a plurality of series connected subsystems, each including a plurality of said modules connected in series, the step of isolating the at least one retrievable module by module isolating means not cutting off the supply of power or control signals to the remaining modules.

Each module may have a module based part of the module isolating means and the host facility may have a host facility based part of the module isolating means and wherein the step of isolating the at least one retrievable module may involve the operation of two of said parts of said module isolating means. Each module based part of the module isolating means may include two switches in series relationship, each switch being on opposite sides of connection means to an electrical load of the module, and the host facility based part of the module isolating means may include a switch in each of the two electrical connections between the host facility and the modules and wherein the step of isolating at least one module may involve the operation of two of said switches.

It is preferable for one module or a plurality of serially adjacent modules to constitute a removable part of the system to be isolated and removed. The step of isolating the removable part of the system may involve operation of serially adjacent parts of the module isolating means on opposite sides of the removable part. The parts of the module isolating means operated may both be module based parts thereof when the serially adjacent parts on opposite sides of the removable part are modules. Alternatively, the parts of the module isolating means operated may comprise a module based part thereof and a host facility based part thereof when one of the serially adjacent parts on one side of the removable part is a module and that on the opposite side comprises part of the host facility.

Each module desirably includes a first portion of a disconnectable electrical power connector means and may be engaged in a location having a complementary second portion of the electrical power connector means and wherein removal of the or each module may involve removing it from its associated location thereby disengaging the complementary portions of the electrical power connector means. The electrical power connector means may be wet mateable in order that the connector means can mate underwater. Preferably, one portion of the electrical power connector means is a plug and the other portion is a socket. At least one module may include a transformer to which the first portion of the electrical power connector means is connected whereby high voltage power received by the module is lowered to an acceptable level for the module to effectively operate.

Each removed module may be replaced with a replacement module and the module isolating means may be operated to restore series power distribution or control signal distribution throughout the system. With such replacement it is possible for the remaining modules to continue to operate.

At least one different module may be subsequently removed from the system using the method described above.

The method may be for electrical power distribution and control signal distribution.

Preferably, the module isolating means comprises switchgear for electrically isolating at least one module.

The system is preferably substantially underwater. The host facility may not be underwater. The sub-systems are desirably on a seabed.

The system may include control means for substantially controlling operation of the module in order that normal operation of the module is controlled by the control means making the module substantially autonomous. Thus, the control means may provide control to the many parts of the module that need power/controlling. Desirably, the or each module includes the control means. The control means may be at least substantially an electrical control means or the control means may comprise a completely electrical control means. Such an arrangement obviates the requirement for many hydraulic lines from the host facility to various parts of the module that need controlling. The host facility is desirably in communication with the control means. This may be via the electrical power connector means. Alternatively, the host facility may be in communication with the control means via control connector means separate from the electrical power connector means. Thus, the controllable parts of the modules are not separately connected by individual lines to the host facility. The control connector means may be wet mateable.

The power distribution system permits the removal of one or more modules without powering down the system and in which the electrical switchgear is not present in apparatus into which the module is inserted, i.e. apparatus which will normally remain on, say, a seabed. Should any problem occur with the switchgear of a given module for example, electrical isolation of that module can be achieved by remote operation of the switchgear in the adjacent modules or adjacent module and host facility.

According to another aspect of the present invention there is provided a system comprising a plurality of retrievable substantially autonomous modules, module isolating means, and a host facility, the host facility and the modules being connected in series so as to form a circuit, the host facility being arranged to provide power or control signals to all of the modules, the series connections and the module isolating means being arranged such that isolating at least one module so that it or they can be removed does not cut off the supply of power or control signals to any of the remaining modules of the system.

BRIEF DESCRIPTION OF THE DRAWINGS

An embodiment of the present invention will now be described, by way of example, with reference to the accompanying drawings, in which:

FIGS. 6 to 9 are schematic diagrams of a subsea field showing various modules being removed from modular seabed sub-systems using the method according to the invention.

DETAILED DESCRIPTION OF THE PREFERRED EMBODIMENT

Figure 1:
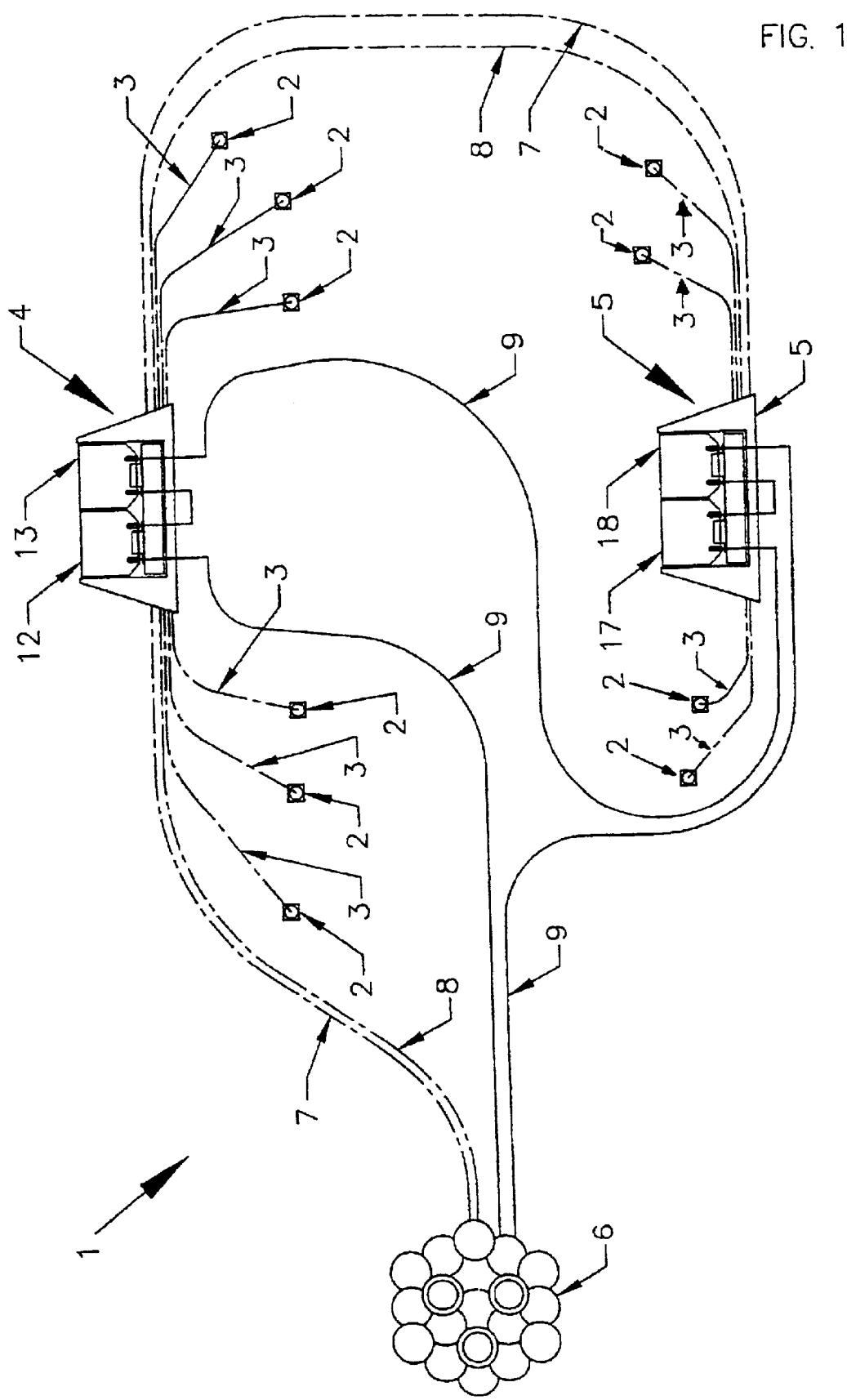
FIG. 1 is a schematic diagram of a subsea field comprising a substantially underwater system according to one embodiment of the invention.
Figure 2:
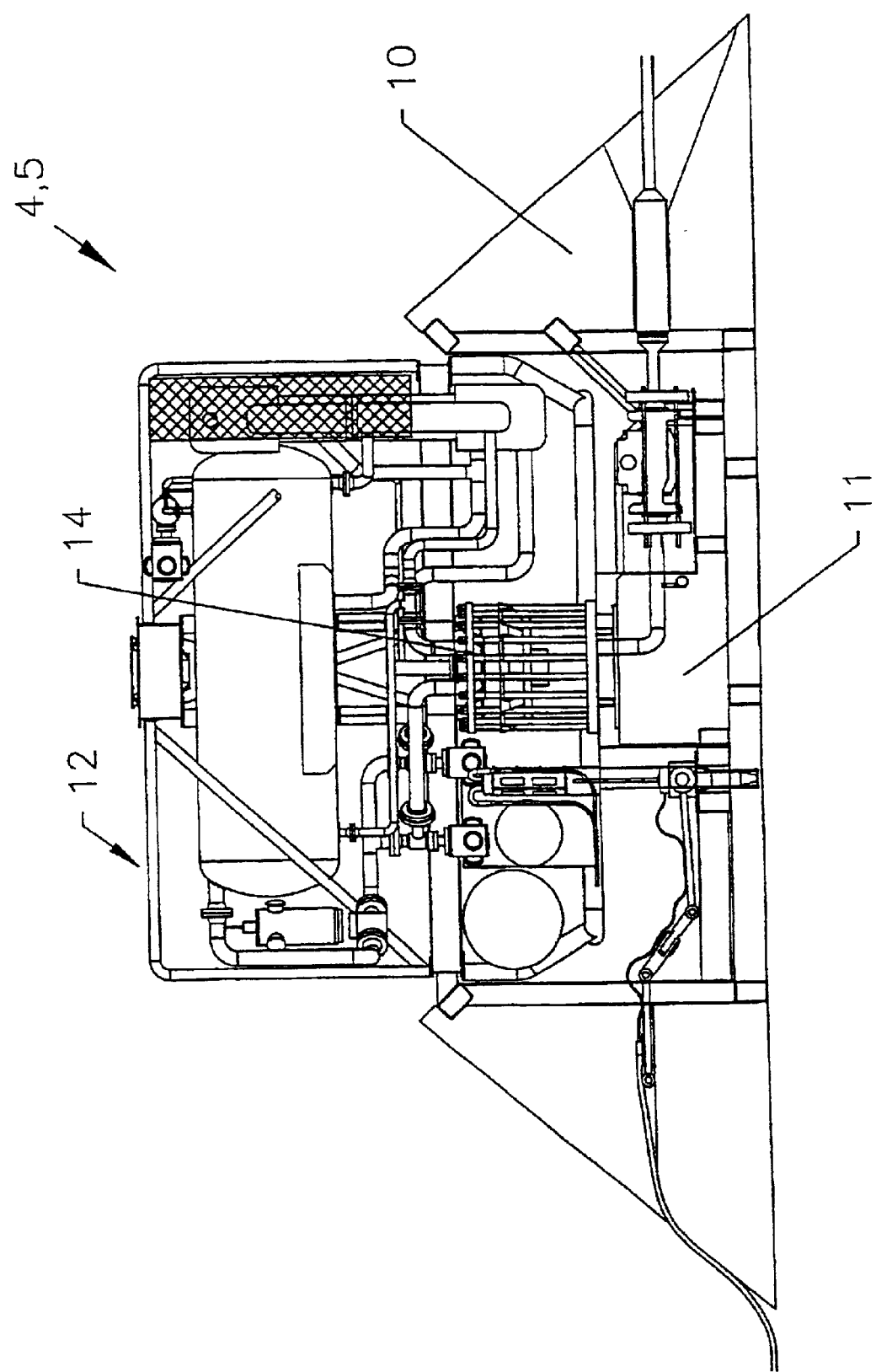
FIG. 2 is an elevational view of a modular seabed sub-system of the substantially underwater system.

Referring to FIGS. 1 and 2 of the accompanying drawings, a subsea field 1 includes wells 2 for removing a fluid mixture comprising water and oil/gas from reservoirs beneath the seabed. The wells 2 are connected by underwater flow lines 3, such as rigid and/or flexible pipelines, to modular subsea or seabed sub-systems 4,5 of a substantially underwater system where the oil and/or gas may be extracted from the fluid mixture and the oil/gas flows under well pressure or is pumped to a host facility 6 via flow lines 7,8, the flow lines 7,8 connecting the modular seabed sub-systems 4,5 in series to the host facility 6. A plurality of wells may be connected to a template before being connected to a modular seabed sub-system. The host facility may be, for example, onshore or on a fixed or a floating rig. The host facility 6 has an integrated power and control line 9 connecting the modular seabed sub-systems 4,5 in series to form a circuit, the host facility 6 providing the power and control to these sub-systems 4,5.

Each modular seabed sub-system 4,5 comprises a support frame 10 which is essentially of a tubular framework construction and is secured to the seabed. Inside each frame 10 is a docking unit or location 11 which is connected to flowlines by flowline tie-in and installation tools which are operated by remote operating vehicles (ROVs) or directly from a ship. Two retrievable substantially autonomous modules 12,13 (of which only one module 12 can be seen in FIG. 2 as it blocks the view of module 13 behind it) are installed in the frame 10. The modules 12,13 are connected to the docking unit 11 by multi-ported valve isolation connectors 14 which are described in GB-A-2261271. The retrievable modules are designed to include a variety of equipment, such as separators for separating gas and liquid comprising oil and water from the fluid mixture received via flow lines 3, the separated gas and liquid being pumped to the host facility via the further flow lines 7,8.

Figure 3:
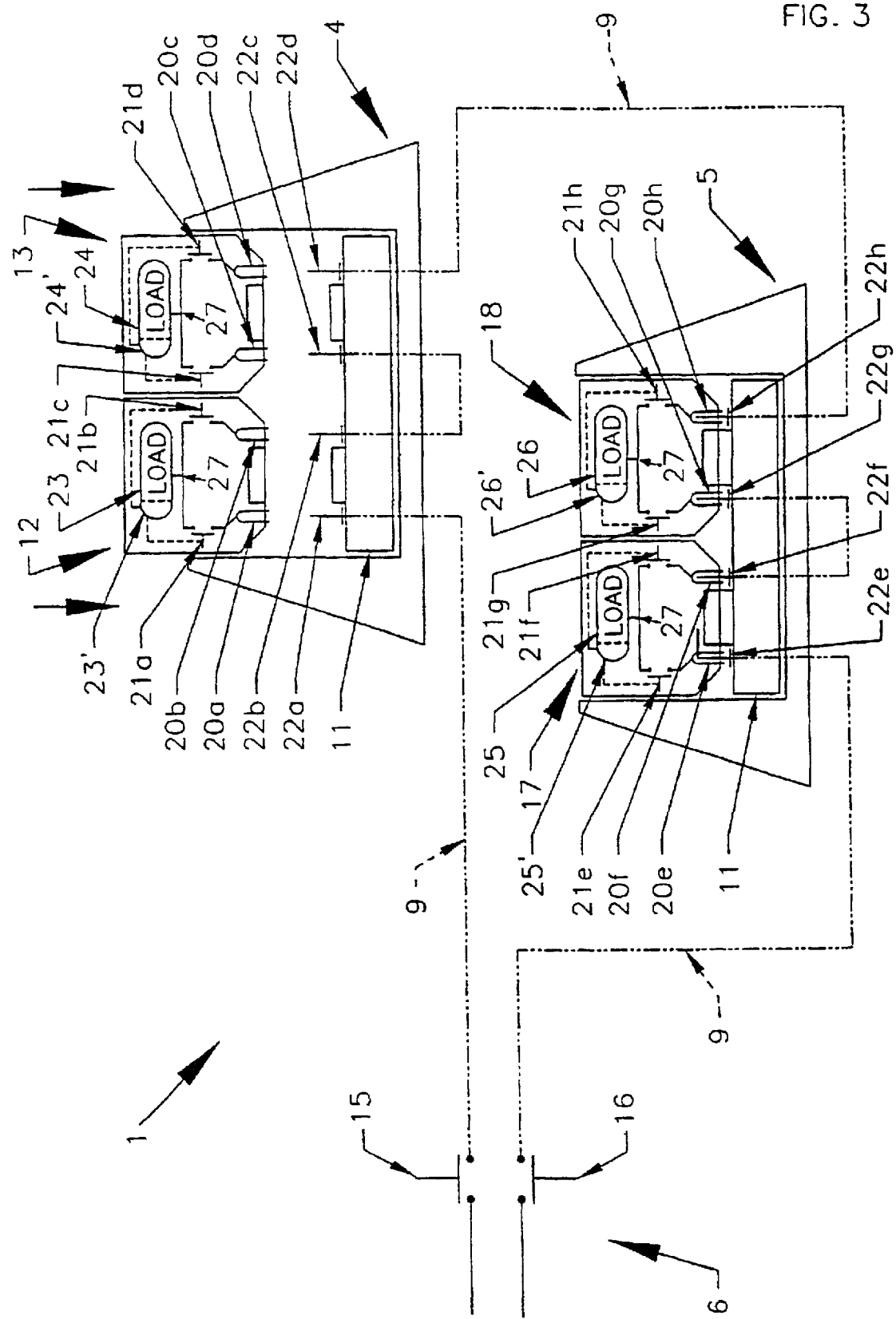
FIGS. 3 and 4 are schematic diagrams of a subsea field comprising the modular seabed sub-systems of FIG. 2.

Referring to FIG. 3, a field 1 comprising a substantially underwater system is shown having a host facility 6 and first and second modular seabed sub-systems 4,5 connected in series by an integrated power/control line 9 to form a circuit. The power/control line 9 thus carries signal information as well as power. Any flow lines have been omitted for clarity. The circuit is breakable at the host facility 6 by means of switchgears 15,16 which each isolate one of the two ends of the power/control line 9 from a power and control supply at the host facility 6. Each seabed sub-system 4,5 has two retrievable substantially autonomous subsea modules 12,13:17,18 with the first seabed sub-system 4 having the modules 12,13 installed therein. Each module has two electric power distribution switchgears 21a . . . h in series relationship, each switchgear being on opposite sides of a connection 27 to an electrical/hydraulic load 23,24,25,26 via a transformer (not shown). Each switchgear is also connected to a power/control socket 20a . . . h and each socket has an associated power/control plug 22a . . . h which is connected to the docking unit 11. The power/control sockets 20a . . . h and plugs 22a . . . h are high voltage, high power subsea wet mateable electrical connectors like those described in EP 0428515, for example, in which the connector is mated in insulating liquid which is then replaced with gas at near atmospheric pressure.

Each retrievable module 12,13,17,18 has a control chamber and power chamber (not shown). The control chamber houses control electronics 23',24',25',26' which form part of the load 23,24,25,26, and the power chamber houses the power switchgear 21a . . . h. The control electronics 23', 24',25',26' controls the normal running of the module and is in communication with the host facility via the integrated power/control line 9 from where it may, for example, be reprogrammed or be instructed to shut down the module and open or close the switchgear 21a . . . h. The control chamber and power chamber are constructed as pressure vessels and have cables from the sockets 20a . . . h of the connectors outside the chambers connecting to the control electronics 23',24',25',26' and switchgear 21a . . . h in their chambers. To reduce high voltage input from a socket, the socket may be connected to the control electronics via a transformer (not shown).

FIG. 3 shows each docking unit 11 having four power/control plugs 22a . . . d,22e . . . h. For the first seabed sub-system 4 the first plug 22a is connected to the host facility 6, the second plug 22b is connected to the third plug 22c and the fourth plug 22d is connected to a plug 22h in the second seabed sub-system 5. The modules 12,13 being installed on docking unit 11 are respectively adapted to provide the connections between the first and second plugs 22a,22b and the third and fourth plugs 22c,22d. Thus, when module 12 is installed, plug 22a will be connected to plug 22b in series via socket 20a, switchgear 21a,21b and socket 20b and when module 13 is installed, plug 22c will be connected to plug 22d in series via socket 20c, switchgear 21c,21d and socket 20d. The second seabed sub-system 5 is similar to the first seabed sub-system 4 with modules 17,18 being shown already installed on the docking unit 11. Thus, module 17 causes plug 22e to be connected to plug 22f in series via socket 20e, switchgear 21e,21f and socket 20f and module 18 causes plug 22g to be connected to plug 22h in series via socket 20g, switchgear 21g,21h and socket 20h.

Hence, there is a circuit connecting the seabed sub-systems 4,5 to the host facility 6.

Figure 4:
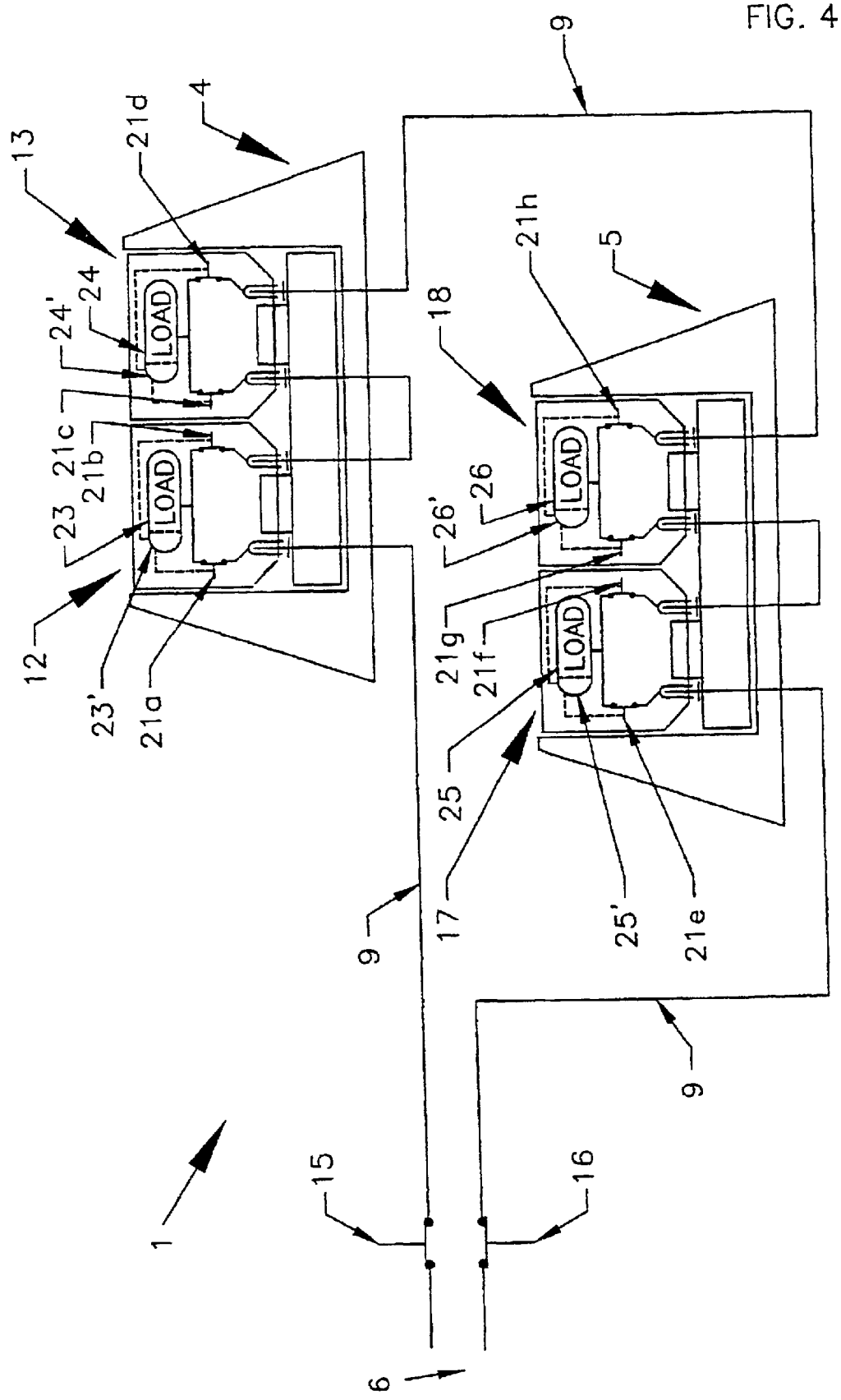

FIG. 4 shows all the modules 12,13,17,18 installed. When the field 1 is commissioned, the host facility switchgear 15,16 is activated to connect the circuit to the power supply. The power flows from the supply via the closed host facility switchgear 15 to load 23 via closed switchgear 21a and also from the closed host facility switchgear 16 to load 25 via closed switchgear 21e. The power to load 23 then flows to load 24 via closed switchgear 21b,21c and the power to load 25 flows to load 26 via closed switchgear 21f,21g. Load 24 is connected to load 26 via closed switchgear 21d,21h thus completing the circuit so that power can flow in either or both directions from the host facility in the manner of a "ring main".

Figure 5:
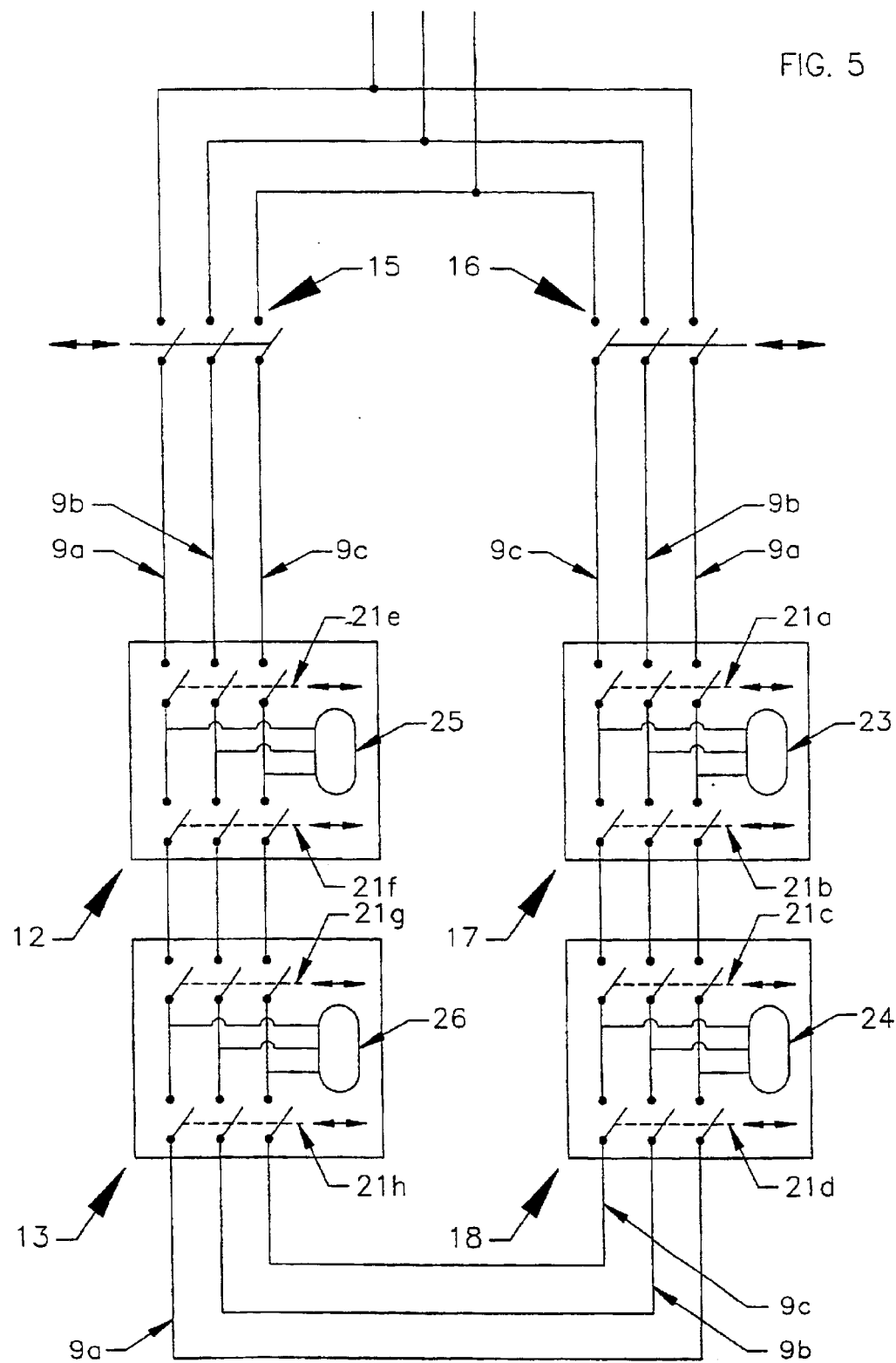
FIG. 5 is a schematic circuit diagram of the subsea field.

The power/control line 9 comprises three-phase power supply lines 9a,9b,9c illustrated in the simplified circuit diagram shown in FIG. 5. The power supply line 9a forms a series connection from the switchgear 15 to the switchgear 16 through the modules 12,13,17,18. The power supply line 9b also forms a series connection from the switchgear 15 to the switchgear 16 through the modules 12,13,17,18 as does the power supply line 9c. Each load 23,24,25,26 is connected across the power supply lines 9a,9b,9c as shown. Each host facility switchgear 15,16 and switchgear 21a . . . h effects the switching of all three power supply lines 9a,9b,9c.

Figure 6:
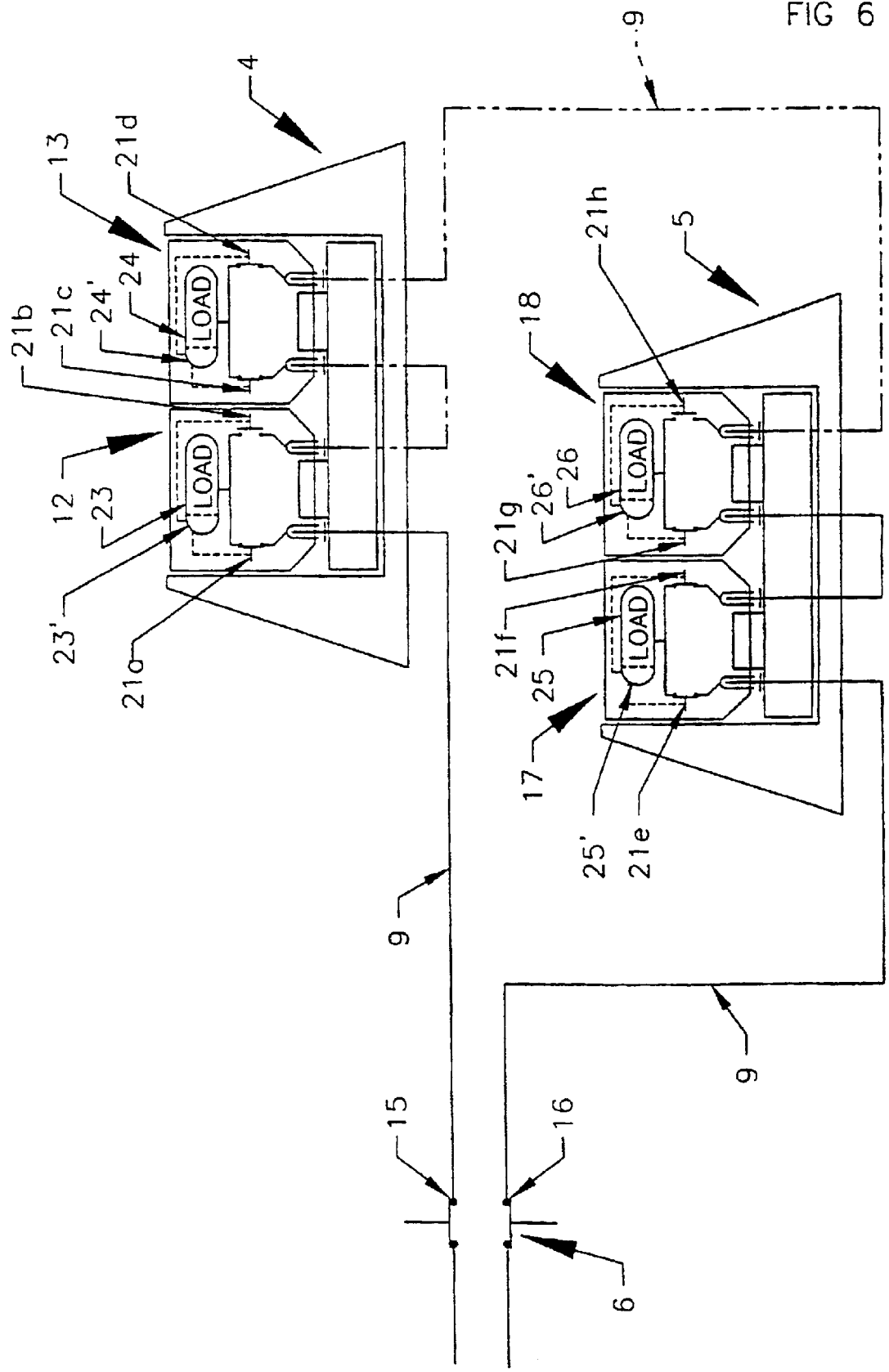
Figure 7:
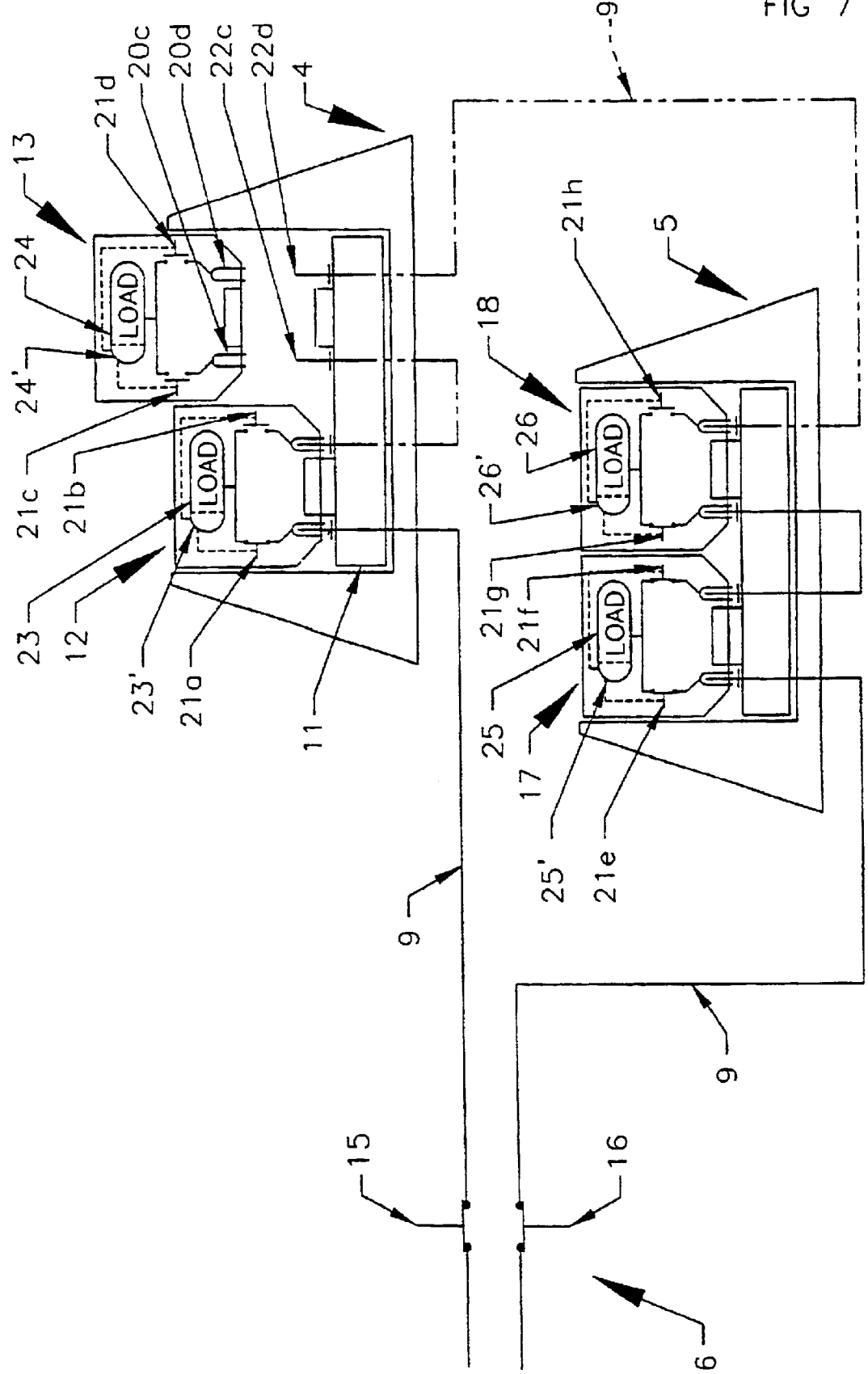

To retrieve a module from one of the seabed sub-systems, that module needs to be electrically isolated. FIGS. 6 and 7 shows module 13 being isolated and retrieved from the first seabed sub-system 4. Switchgear 21h in module 18 and switchgear 21b in module 12, which are serially adjacent and are on opposite sides of the module 13, are opened thus isolating module 13. This is effected by sending an apparatus control signal down the power/control line 9 from the host facility 6. Coding of the signal enables the control electronics 23',24',25',26' of each module to determine which signals relate to which module. Each switchgear 21b,21h to be opened is accordingly actuated by its associated control electronics 23',26'. The remaining modules 12,17,18 are all still electrically connected to the host facility 6 and so can continue to operate and module 13 is then retrieved as shown in FIG. 7. Once retrieved, module 13 may be inspected/adjusted before being lowered back to and installed in the sub-system 4 or a separate replacement module may be lowered and installed. The sockets 20c,20d (see FIG. 7) of the lowered module dock and mate with the plugs 22c,22d of the docking unit 11. Switchgear 21h in module 18 and switchgear 21b in module 12 are closed thus connecting the lowered module to the host facility 6 and hence restoring series power distribution throughout the substantially underwater system.

Figure 8:
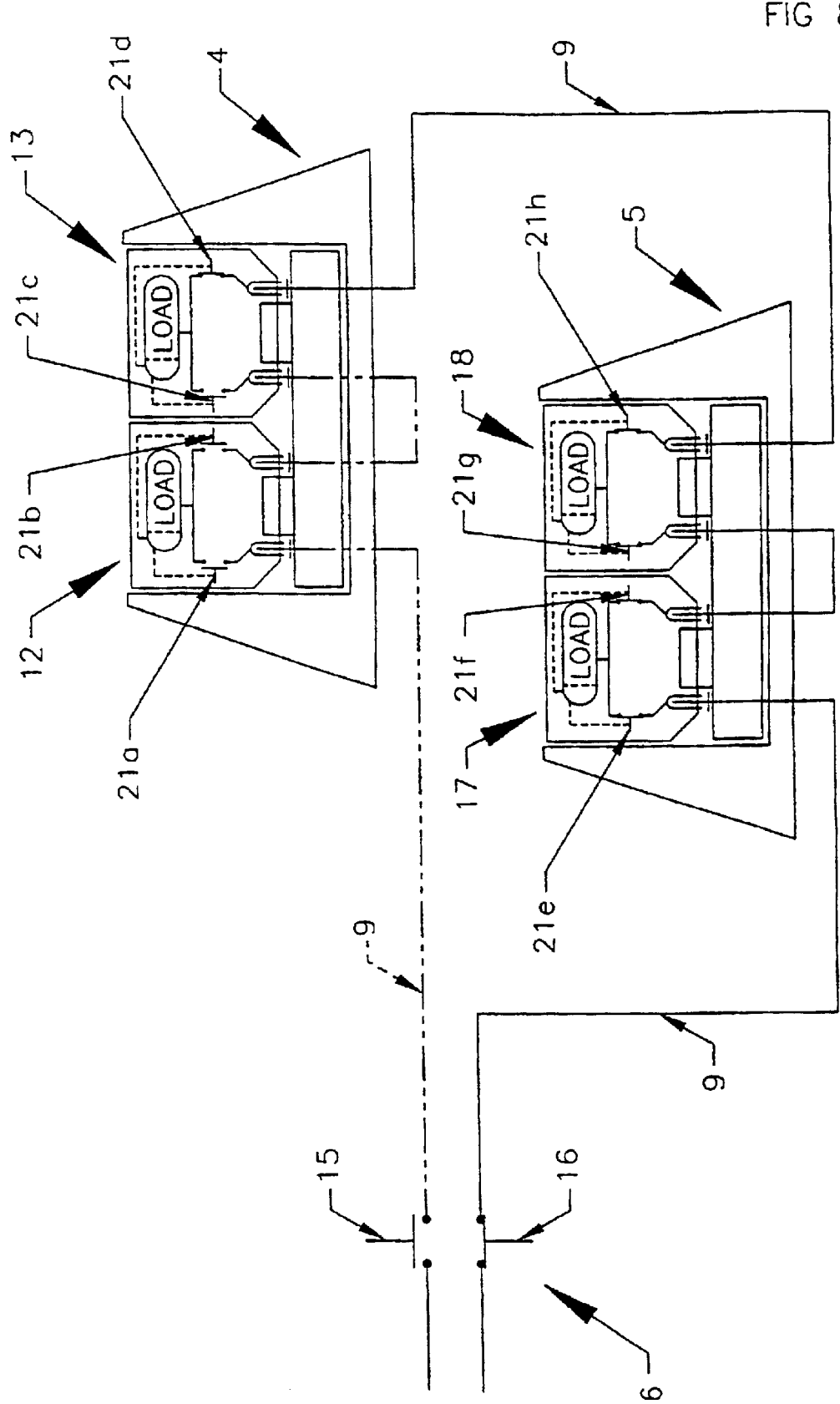

FIGS. 8 and 9 shows module 12 being retrieved from the first modular seabed sub-system 4. Module 12 is serially adjacent to the host facility 6. Host facility switchgear 15 and switchgear 21c in module 13, which are serially adjacent to and are on opposite sides of the module 12, are opened thus isolating module 12. The remaining modules 13,17,18 are all still connected to the host facility 6 and so can continue to operate and module 12 is then retrieved as shown in FIG. 9. Module 12 may then be replaced in a similar manner to that described above for module 13.

It is possible to isolate and retrieve a plurality of serially adjacent modules. For example, to retrieve both modules 12 and 13, host facility switchgear 15 and switchgear 21h in module 18, which are serially adjacent to and are on opposite sides of the modules 12 and 13, are opened thus isolating modules 12,13. The two remaining modules 17,18 are still connected to the host facility 6 and so can continue to operate and modules 12,13 are then retrieved. To retrieve, say, both modules 13 and 18, switchgear 21b,21f are opened, isolating module 13 and 18.

The module seabed sub-systems are all electric, although hydraulics could be used if so desired for selected functions. Electrical systems can operate over greater distances/deeper levels, transmit emergency signals instantaneously, such as to shut down a part of a seabed sub-system, and are cheaper to manufacture and maintain.

If the modulator seabed sub-systems are not operating at a long distance from the host facility then high voltage may not be required and consequently the modules may not require transformers.

Whilst a particular embodiment has been described, it will be understood that various modifications may be made without departing from the scope of the invention. For example, the sub-systems may be land based and not underwater. Any suitable number of modular sub-systems may be used in a field. Each sub-system may be designed to hold any suitable number of retrievable modules. The integrated power/control line may be replaced by a supply umbilical carrying power and control lines or by separate power and control lines, the control line being connected to the module by a disconnectable, wet mateable connector. The plugs may be located on other parts of the sub-system and not just the docking unit. Although the sub-systems have been described as extracting oil/gas they may not necessarily process the fluid mixture from the reservoir and may, for example, simply commingle or pump the fluid mixture.

What is claimed is:

1. A method of electrical power distribution or control signal distribution suitable for a substantially underwater system, comprising the steps of:
   providing a plurality of retrievable substantially autonomous modules for receiving and acting on fluid mixture, module isolating means and a host facility, each module having a module based part of the module isolating means within the module and the host facility having a host facility based part of the module isolating means, the host facility and the modules being connected in series so as to form a circuit, the host facility providing power or control signals to all of the modules;
   isolating at least one module by operation of two of said parts of said module isolating means; and
   removing the isolated at least one module without cutting off the supply of power or control signals to any of the remaining modules of the system.

2. A method as claimed in claim 1, including a plurality of series connected sub-systems, each including a plurality of said modules connected in series, the step of isolating the at least one retrievable module by module isolating means not cutting off the supply of power or control signals to the remaining modules.

3. A method as claimed in claim 2, wherein the sub-systems are on a seabed.

4. A method as claimed in claim 1, wherein each module based part of the module isolating means includes two switches in series relationship, each switch being on opposite sides of connection means to an electrical load of the module, and the host facility based part of the module isolating means includes a switch in each of the two electrical connections between the host facility and the modules and wherein the step of isolating at least one module involves the operation of two of said switches.

5. A method as claimed in claim 1, wherein one module or a plurality of serially adjacent modules constituting a removable part of the system are isolated and removed.

6. A method as claimed in claim 5, wherein the step of isolating the removable part of the system involves operation of serially adjacent parts of the module isolating means on opposite sides of the removable part.

7. A method as claimed in claim 6, wherein the parts of the module isolating means operated are both module based parts thereof.

8. A method as claimed in claim 6, wherein the parts of the module isolating means operated comprise a module based part thereof and a host facility based part thereof.

9. A method as claimed in claim 1, wherein each module includes a first portion of a disconnectable electrical power connector means and engages a location having a complementary second portion of the electrical power connector means and wherein removal of the at least one module involves removing it from its associated location thereby disengaging the complementary portions of the electrical power connector means.

10. A method as claimed in claim 1, including the further steps of replacing the at least one removed module with a replacement module and operating the module isolating means to restore series power distribution or control signal distribution throughout the system.

11. A method as claimed in claim 10, including the further steps of removing at least one different module from the system using the method according to claim 1.

12. A method as claimed in claim 1, wherein the method is for electrical power distribution and control signal distribution.

13. A method as claimed in claim 1, wherein the system is substantially underwater.

14. A system comprising a plurality of retrievable substantially autonomous modules for receiving and acting on fluid mixture, module isolating means and a host facility, each module having a module based part of the module isolating means and the host facility having a host facility based part of the module isolating means, the host facility and the modules being connected in series so as to form a circuit, the host facility being arranged to provide power or control signals to all of the modules and the series connections, and two of said parts of said module isolating means being arranged such that isolating at least one module so that it or they can be removed does not cut off the supply of power or control signals to any of the remaining modules of the system.

15. A system as claimed in claim 14, including a plurality of series connected sub-systems, each including a plurality of said modules connected in series.

16. A system as claimed in claim 15, wherein the sub-systems are on a seabed.

17. A system as claimed in claim 14, wherein each module based part of the module isolating means includes two switches in series relationship, each switch being on opposite sides of connection means to an electrical load of the module and the host facility based part of the module isolating means includes a switch in each of the two electrical connections between the host facility and the modules, at least one module being adapted to being isolated by involving the operation of two of said switches.

18. A system as claimed in claim 14, wherein one module or a plurality of serially adjacent modules constitute a removable part of the system to be isolated and removed.

19. A system as claimed in claim 18, wherein serially adjacent parts of the module isolating means on opposite sides of the removable part are adapted to isolate the removable part of the system.

20. A system as claimed in claim 19, wherein the parts of the module isolating means are both module based parts thereof.

21. A system as claimed in claim 19, wherein the parts of the module isolating means operated comprise a module based part thereof and a host facility based part thereof.

22. A system as claimed in claim 14, wherein each module includes a first portion of a disconnectable electrical power connector means and the system including a location having a complementary second portion of the electrical power connector means for the first portion to engage so that the removal of the at least one module involves removing it from its associated location thereby disengaging the complementary portions of the electrical power connector means.

23. A system as claimed in claim 22, wherein the at least one module includes the control means, and the host facility is in communication with the control means via the electrical power connector means.

24. A system as claimed in claim 22, wherein the host facility is in communication with the control means via control connector means separate from the electrical power connector means.

25. A system as claimed in claim 24, wherein the control connector means is wet mateable.

26. A system as claimed in claim 22, wherein the electrical power connector means is wet mateable.

27. A system as claimed in claim 22, wherein one portion of the electrical power connector means is a plug and the other portion is a socket.

28. A system as claimed in claim 22, wherein at least one module includes a transformer to which the first portion of the electrical power connector means is connected.

29. A system as claimed in claim 14, wherein the module isolating means is adapted to restore series power distribution or control signal distribution throughout the system when the at least one removed module has been replaced with a replacement module.

30. A system as claimed in claim 14, wherein the host facility is arranged to provide power and control signals to all of the modules, the series connections and the module isolating means being arranged such that isolating at least one module so that it or they can be removed does not cut off the supply of power and control signals to any of the remaining modules of the system.

31. A system as claimed in claim 14, wherein the module isolating means comprises switchgear for electrically isolating at least one module.

32. A system as claimed in claim 14, including control means for substantially controlling operation of the module.

33. A system as claimed in claim 32, wherein the at least one module includes the control means.

34. A system as claimed in claim 32, wherein the control means is at least substantially an electrical control means or the control means comprises a completely electrical control means.

35. A system as claimed in claim 32, wherein the host facility is in communication with the control means.

36. A system as claimed in claim 14, wherein the system is substantially underwater.

37. A system as claimed in claim 36, wherein the host facility is not underwater.

* * * * *

UNITED STATES PATENT AND TRADEMARK OFFICE
CERTIFICATE OF CORRECTION

PATENT NO. : 6,873,063 B1
DATED : March 29, 2005
INVENTOR(S) : Appleford et al.

It is certified that error appears in the above-identified patent and that said Letters Patent is hereby corrected as shown below:

Column 7,
Lines 56 and 65, "in claim 14" should read -- in claim 15 --.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,873,063 B1 | Page 1 of 1 |
| APPLICATION NO. | : 10/070231 | |
| DATED | : March 29, 2005 | |
| INVENTOR(S) | : Appleford et al. | |

It is certified that error appears in the above-identified patent and that said Letters Patent is hereby corrected as shown below:

PLEASE ISSUE A CORRECTIVE CERTIFICATE OF CORRECTION AS FOLLOWS:

Column 7,

Lines 56 and 65 "in claim 15" should read -- in claim 14 --.

Signed and Sealed this

Twenty-eighth Day of August, 2007

JON W. DUDAS
*Director of the United States Patent and Trademark Office*